United States Patent [19]

Hubbard

[11] 4,100,549

[45] Jul. 11, 1978

[54] DISPOSABLE MARKER

[75] Inventor: James R. Hubbard, Moorestown, N.J.

[73] Assignee: Graphic Controls Corporation, Cherry Hill, N.J.

[21] Appl. No.: 654,406

[22] Filed: Feb. 2, 1976

Related U.S. Application Data

[63] Continuation-in-part of Ser. No. 554,521, Mar. 3, 1975, abandoned.

[51] Int. Cl.[2] .......... G01D 15/16; B67D 3/00; B43K 5/00

[52] U.S. Cl. .......... 346/140 A; 222/187; 401/199

[58] Field of Search .......... 346/140 A; 222/187; 401/198, 199

[56] References Cited

U.S. PATENT DOCUMENTS

| | | | |
|---|---|---|---|
| 3,134,544 | 5/1964 | Copley | 222/187 X |
| 3,611,430 | 10/1971 | Watchorn et al. | 346/140 A |
| 3,745,243 | 7/1973 | Seitz | 346/140 A UX |
| 3,767,520 | 10/1973 | Dick et al. | 222/187 |
| 3,778,840 | 12/1973 | Dahl | 346/140 A X |
| 3,893,130 | 7/1975 | Browning et al. | 346/140 A |
| 3,934,255 | 1/1976 | Taylor | 346/140 A |

*Primary Examiner*—George H. Miller, Jr.
*Attorney, Agent, or Firm*—Miller & Prestia

[57] ABSTRACT

Convenient disposable marker design facilitates manufacture of disposable markers at low cost within a wide range of configurations and writing capacities. Marker comprises tubular, plastic-sheathed fibrous ink reservoir material cut to predetermined length for a particular marker and capped at one end. At the opposite end, a tip cap with nib projection is sealingly mounted on the plastic sheathed reservoir material.

In another form of the invention, the tubular outer body fits snugly over a tip cap projection and is sealed by an external sealing rib to flushly mate with the tip cap body. A metallic holder clip fastens the disposable marker securely to the recorder pen arm.

11 Claims, 9 Drawing Figures

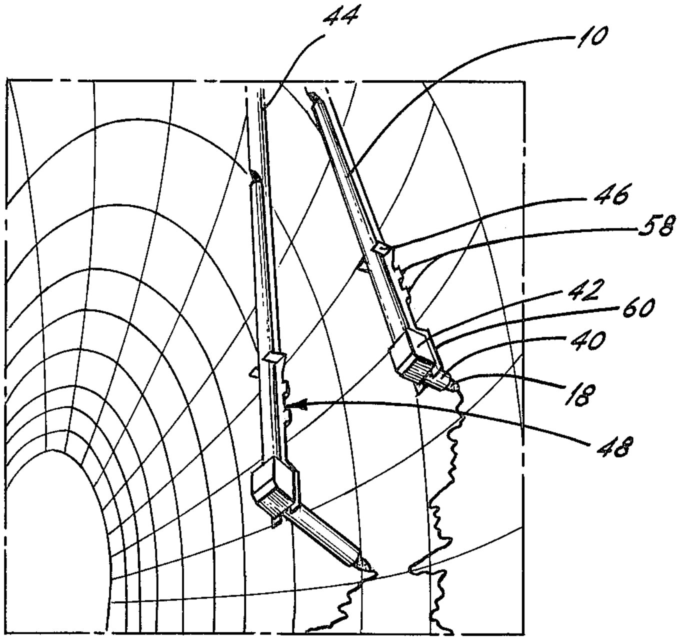
FIG. 7.
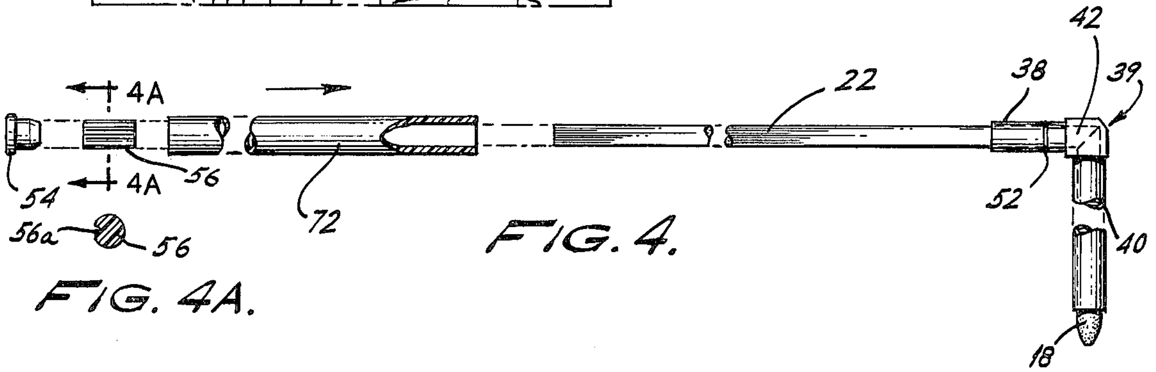
FIG. 4.
FIG. 4A.
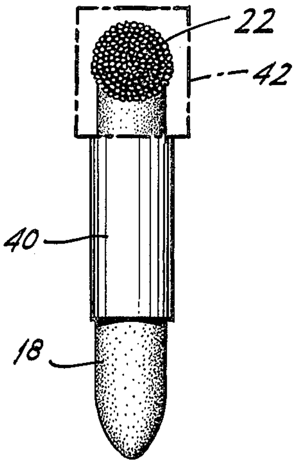
FIG. 6.
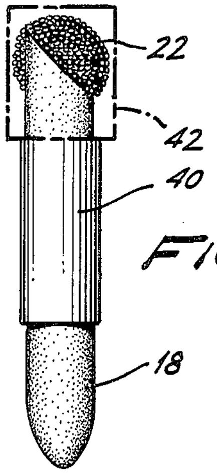
FIG. 8.
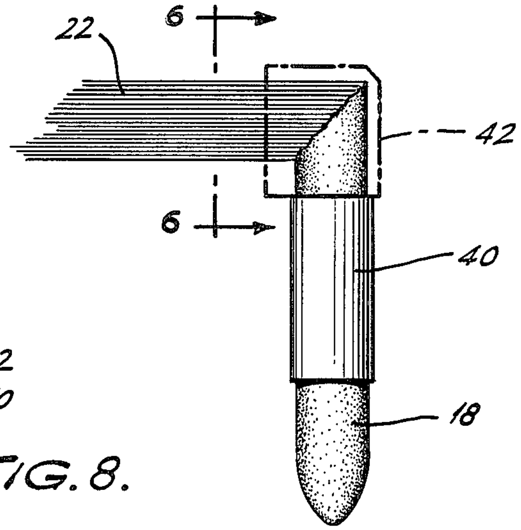
FIG. 5.

DISPOSABLE MARKER

This is a continuation-in-part of application Ser. No. 554,521 filed Mar. 3, 1975, abandoned of common inventorship and assignment herewith.

INTRODUCTION

This invention pertains to disposable markers and particularly to disposable markers of specific configurations facilitating manufacture of a wide variety of markers from a relatively simple assortment of component pieces.

BACKGROUND

Disposable markers have been used in the recording instrument field for many years. Conventionally, plastic marker bodies with specifically configured tips and nib projections are molded to provide a marker fitting within particular instrument pen envelopes and also to provide specific writing characteristics, particularly writing time or ink capacity. In the past, most such instruments required a disposable marker of a particular configuration, each requiring relatively expensive and unique manufacturing tools and operations.

While self-contained ink reservoir body material has been proposed in the hand-held marker field (see for example U.S. Pat. No. 3,767,520), there has remained a need in the instrument pen and particularly the disposable marker instrument pen field for a disposable marker design sufficiently simple to render the manufacturing operation less expensive and sufficiently flexible to permit manufacture of a wide variety of disposable markers of varying size, outer configuration and ink capacity.

OBJECTS

It is therefore the general object of the present invention to provide such a marker design and particularly to provide a wide range of disposable markers which may be manufactured at lower cost that has heretofore been possible.

BRIEF SUMMARY OF THE INVENTION

These objects, and others which will be apparent in the course of the subsequent description of this invention, are met, briefly, by a disposable marker consisting of an end capped, tubular, plastic-sheathed fibrous ink reservoir material sealingly capped at its writing end with a tip cap including a nib projection housing a capillary, generally fibrous, nib. The plastic-sheathed fibrous ink reservoir material is cut at its writing end so as to expose an outer end surface of the ink reservoir material. The nib extends beyond the end of the nib projection and through the nib projection to mate with the exposed outer end surface of the ink reservoir material.

In one preferred form of the present invention, the nib projection is angled forwardly or the plastic-sheathed fibrous ink reservoir material is angled, at its writing end, rearwardly, so as to facilitate contact of the capillary nib with the exposed outer end surface of the ink reservoir material without requiring a passageway through the plastic sheathing. In another preferred embodiment of this invention, the tip cap includes projections through which protrude the nib and the ink reservoir material, meeting one another within the tip cap.

This invention may be better understood by reference to the following detailed description thereof, taken in conjunction with the appended claims and the accompanying drawings in which:

BRIEF DESCRIPTION OF FIGURES

FIG. 4 is an outer view of another preferred embodiment of a marker made in accordance with the present invention;

FIG. 4*a* is a sectional view of the marker shown in FIG. 4 taken in plane 4A—4A of FIG. 4;

FIG. 5 is an enlarged partially cutaway view of a part of the marker shown in FIG. 4;

FIG. 6 is a sectional view of the marker shown in FIG. 4 taken in the plane 6—6 of FIG. 5;

FIG. 7 is a perspective view of the means utilized to attach the disposable marker of FIGS. 4–6 to a recorder pen arm. The figure shows securely attached disposable markers in use; and FIG. 8 is an enlarged partially cutaway view of the disposable marker shown in FIGS. 4–7 showing another acceptable manner in which fibrous nib 18 may mate with ink reservoir material 22.

DETAILED DESCRIPTION OF THE INVENTION

Figure 1:
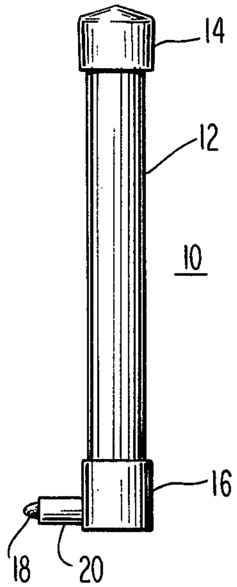
FIG. 1 is an outer view of one disposable marker manufactured and designed in accordance with one preferred embodiment of the present invention.

Referring more specifically to FIG. 1, there is shown disposable marker 10 containing an elongated plastic-sheathed fibrous ink reservoir material 12, sealed at one end by end cap 14. At its opposite end, plastic-sheathed fibrous ink reservoir material 12 mates through sealed engagement with tip cap 16 and perpendicular nib projection 20 through which is extended a capillary, generally fibrous nib 18.

Figure 2:
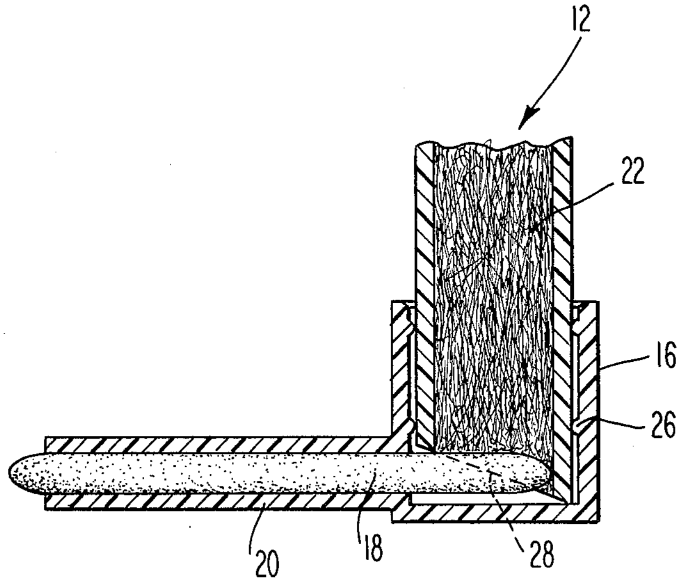
FIG. 2 is an enlarged cutaway view of the marker shown in FIG. 1.

As better seen in FIG. 2, in this preferred form of the present invention, tip cap 16 is sealingly secured to plastic-sheathed fibrous ink reservoir material 12 by means of embossed sealing beads 26 about the inside of the tip cap 16 and engaging plastic sheathing 72. Alternatively, a resilient, tightly fitting end cap may be secured on plastic-sheathed fibrous ink reservoir material 12 without benefit of embossed sealing beads 26. Rubber and vinyl are typical of the resilient materials which may be used for this purpose.

Also seen in FIG. 2 is an exposed outer end surface of an ink reservoir material in contact with the inner end of nib 18. In accordance with one preferred embodiment of the present invention, plastic-sheathed fibrous ink reservoir material 12 includes angularly cut front face 28 (i.e., a front face forming an angle other than 90° with the longitudinal axis of plastic sheathing 72) facilitating contact of nib 18 with exposed outer end surface of ink reservoir material 22 upon assembly of cap 16 to plastic-sheathed fibrous ink reservoir material 12 without requiring puncturing for the formation of a passageway through plastic-sheathing 72 for nib 18. Generally, nib 18 enters angularly cut plastic-sheathed fibrous ink reservoir material 12 on its short side and extends towards its long side. For a nib which is perpendicular to be the elongated marker body, the end face of the plastic-sheathed fibrous ink reservoir material is cut at an angle of about 60° with respect to the longitudinal axis of plastic sheathing 72.

Figure 3:
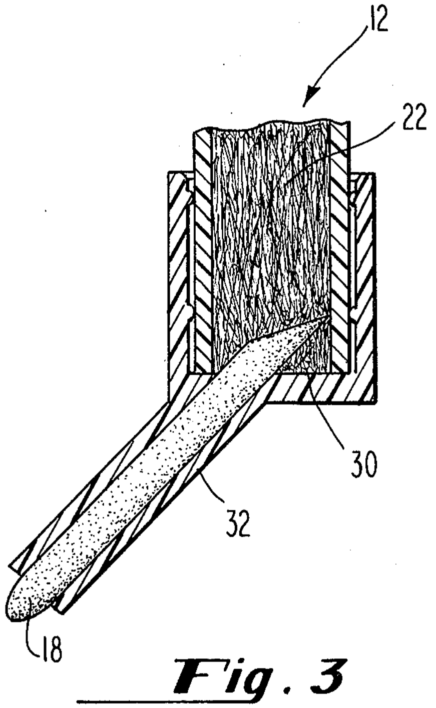
FIG. 3 is an enlarged cutaway view of a portion of another marker, in accordance with the present invention.

Similarly, the manufacturing operation is simplified and the necessity for forming a hole in the sidewall of plastic sheathing 72, is avoided in forwardly projecting nibs, such as the forward angle nib projection 32 in the plastic-sheathed fibrous ink reservoir material 12 seen in FIG. 3. In this configuration, nib 18 protrudes through the perpendicularly cut front face 30 of plastic-sheathed fibrous ink reservoir material 12 and forms an obtuse angle with the longitudinal axis of plastic sheathing 72.

In each of the markers shown in FIGS. 1–3, the plastic-sheathed fibrous ink reservoir material 12, including ink reservoir material 22, may be obtained by simply cutting, to suitable lengths at suitable angles, a length of plastic-sheathed fibrous ink reservoir material of the type shown in U.S. Pat. No. 3,767,520. After cutting the plastic-sheathed fibrous ink reservoir material, the tip cap and nib (with a nib cap to protect the nib until the marker is ready for use) for the specific instrument design are sealingly secured on one end thereof. The ink reservoir material 22 is then filled with ink and the end cap added to complete the manufacturing operation.

FIG. 4 shows another preferred embodiment of the disposable marker of this invention. In this form of the invention, tip cap 39 includes tip cap projections 38, 40 which protrude from tip cap body 42 at a right angle to one another (although in other embodiments this angle may also be either obtuse or acute). An exposed outer end surface of ink reservoir material 22 fits firmly inside of tip cap projection 38, and physically contacts fibrous nib 18. Tip cap projection 38 and ink reservoir material 22 in turn fit securely in plastic sheathing 72. External sealing rib 52 aids in snugly securing plastic sheathing 72 over tip cap projection 38. Tip cap projection 40 houses fibrous nib 18 allowing a portion of fibrous nib 18 to protrude at the end thereof to contact a writing surface. The opposite end of plastic sheathing 72 is sealed by insertion of vent plug 56 and end plug 54. End plug 54 is removed after shipment so as to allow air to enter ink reservoir material 22 through groove **56*a***.

FIG. 4A shows a cross-sectional view of the disposable marker illustrated in FIGS. 4 through 8 taken in plane 4A—4A of FIG. 4. Vent plug 56 includes groove **56*a* through which air may enter ink reservoir material 22**.

FIG. 5 shows an enlarged cutaway view of part of the marker of FIG. 4. Exposed outer end surface of ink reservoir material 22 joins with fibrous nib 18 along a 45° angle mating surface within tip cap body 42 (tip cap body 42 is cut away so as to illustrate this junction).

FIG. 6 shows a partially cutaway view of the marker shown in FIGS. 4 and 5 taken in the plane 6—6. Fibrous nib 18 protrudes from tip cap projection 40 to contact a writing surface.

FIG. 7 shows a recording instrument in use with two disposable markers of the type shown in FIGS. 4–6. Holder body 48 is secured to recorder pen arm 44 by holder body securing clips 58 bent downwardly to tuck underneath recorder pen arm 44. Disposable marker 10 is held in position on top of holder body 48 by both holder tab 46 and by forward positioning tab 60. Holder tab 46 is bent upwardly at 90° angle to the longitudinal axis of recorder pen arm 44 so as to allow disposable marker 10 to sit between the upwardly extending prongs of holder tab 46. Tip cap body 42 sits on top of forward positioning tab 60 so that tip cap projection 40 extends downwardly allowing fibrous nib 18 to contact a writing surface.

FIG. 8 illustrates another acceptable manner in which fibrous nib 18 may mate with exposed outer end surface of ink reservoir material 22. In this headend view, fibrous nib 18 is turned 90° from its position as illustrated in FIGS. 5 and 6. Fibrous nib 18 will efficiently deliver ink to the writing surface regardless of the orientation of its angular mating surface.

While this invention has been described with respect to particular embodiments thereof, it should be understood that it is not limited thereto. Rather, the appended claims are intended to be construed to encompass all forms of the present invention, including those variations and modifications which may be made by those skilled in the art without departing from the true spirit and scope thereof.

I claim the following:

1. A disposable instrument marker pen with self-contained ink supply comprised of an elongated plastic-sheathed fibrous ink reservoir material, an end cap on one end thereof, a tip cap on the opposite end thereof, both of said caps sealingly engaged thereon, said tip cap including a capillary nib extending therefrom, said plastic-sheathed fibrous ink reservoir material being cut at said tip cap end thereof, so that said ink reservoir material will contain an outer end surface area, said capillary nib and said ink reservoir material being adapted to mate at said surface area.

2. A pen, as recited in claim 1, wherein the end face of said plastic-sheathed fibrous ink reservoir material engaging said tip cap is perpendicular to the longitudinal axis of said plastic sheathing and said nib is in physical contact with said ink reservoir material at said end face, the nib extending therefrom forming an obtuse angle with said axis.

3. A pen, as recited in claim 1, wherein said tip cap includes embossed internal beads, said beads being adapted to engage said plastic-sheathed fibrous ink reservoir material and form a sealing engagement of said plastic-sheathed fibrous ink reservoir material and said tip cap.

4. A disposal instrument marker pen, as recited in claim 1, further including an end cap adapted to seal said plastic-sheathed fibrous ink reservoir material at the end opposite from said tip cap end.

5. A pen, as recited in claim 1, wherein the end face of said plastic-sheathed fibrous ink reservoir material engaging said tip cap forms an angle of other than 90° with respect to the longitudinal axis of said plastic sheathing and said nib enters said ink reservoir material at the short side of said plastic sheathing and extends toward the long side of said plastic sheathing.

6. A pen, as recited in claim 5, wherein said end face of said plastic-sheathed fibrous ink reservoir material forms an angle of about 60° with said axis and said nib forms an angle of about 90° with said axis.

7. A disposable instrument marker pen with self-contained ink supply comprised of an elongated plastic-sheathed fibrous ink reservoir material, an end cap on one end thereof, a tip cap on the opposite end thereof, both of said caps sealingly engaged thereon, said tip cap including a capillary nib extending therefrom, said plastic-sheathed fibrous ink reservoir material being cut at said tip cap end thereof, so that said ink reservoir material will contain an outer end surface area, said capillary nib and said ink reservoir material being adapted to mate at said surface area, wherein said tip cap includes two tip cap projections and a tip cap body, said tip cap projections projecting from said tip cap body, said ink reservoir material fitting snugly within one tip cap projection, said plastic sheathing fitting over said projection, said capillary nib fitting in said other tip cap projection with a small section of said nib protruding therefrom, and said capillary nib mating with said ink reservoir material within said tip cap body.

8. A pen, as recited in claim 7, wherein said tip cap projections protrude from said tip cap body at right angles to each other.

9. A pen, as recited in claim 7, wherein said tip cap projection in which said ink reservoir material is snugly fit includes an external sealing rib adapted to snugly secure said plastic sheathing over said tip cap projection.

10. A pen, as recited in claim 7, further including an end plug and a vent plug inserted in said plastic sheathing at the end opposite from said tip cap end, said vent plug including a groove adapted to allow air passage through said ink reservoir material, said end cap being removable.

11. A pen, as recited in claim 7, in combination with a holder body adapted to position said disposable marker on top of an elongated recorder pen arm, said holder body including:

(a) holder body securing clips bent downwardly to tuck underneath said recorder arm;

(b) a holder tab containing prongs bent upwardly, said marker being positioned between said upwardly extending prongs; and (c) a forward positioning tab, said tip cap resting thereon, said tab including means for positively positioning said tip cap thereon.

* * * * *